UNITED STATES PATENT OFFICE.

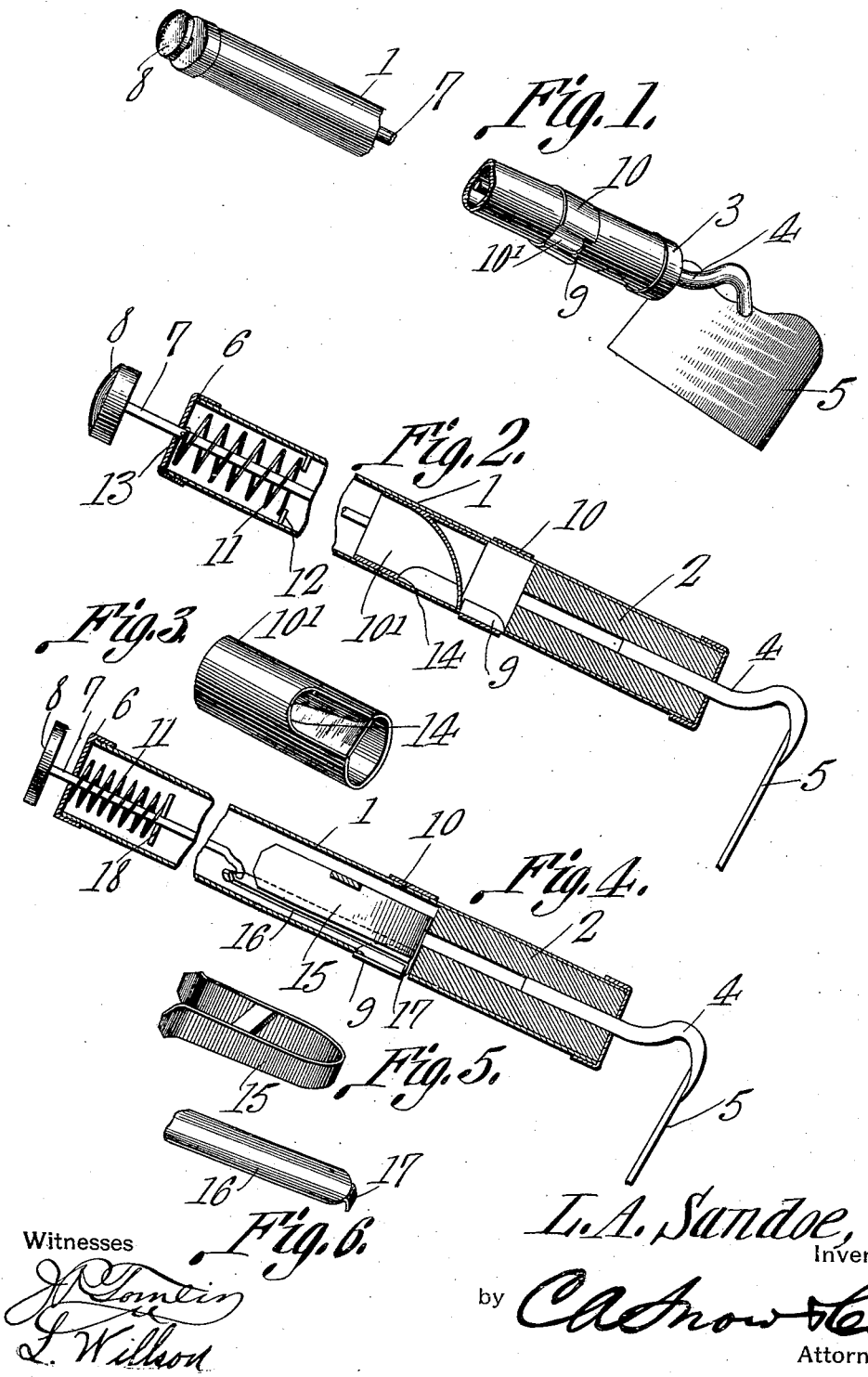

LEROY A. SANDOE, OF HOPE, ARKANSAS.

SEEDING-HOE.

991,653. Specification of Letters Patent. Patented May 9, 1911.

Application filed December 2, 1910. Serial No. 595,267.

*To all whom it may concern:*

Be it known that I, LEROY A. SANDOE, a citizen of the United States, residing at Hope, in the county of Hempstead and State of Arkansas, have invented a new and useful Seeding-Hoe, of which the following is a specification.

This invention has relation to seeding hoes and consists in the novel construction and arrangement of its parts as hereinafter shown and described.

The object of the invention is to provide a hoe of simple structure which may also be used for the purpose of seeding or reseeding a crop at the time that it is cultivated by hand.

With this object in view the hoe includes a handle which is adapted to be used approximately throughout its entire length as a seed receptacle, said handle being closed at its lower end by a plug of wood or similar material into which the shank of the hoe blade is driven. A ferrule surrounds the lower or forward ends of the plug and handle and serves as a stiffening member for the structure. In the vicinity of the said plug the handle is provided with an opening over which a valve is slidably and in some instances rotatably positioned, the said opening adapted to serve as a port through which the seed may pass. A valve is slidably mounted within the handle and is adapted to control the passage of seed to the opening in the handle and a spring actuated rod traverses the length of the handle and is secured at one end to the seed-controlling valve, and at its other end passes through a cap which is screw-threaded upon the rear end of the handle.

In the accompanying drawings:—Figure 1 is a perspective view of one form of the hoe with parts broken away. Fig. 2 is a longitudinal sectional view of the form of hoe as illustrated in Fig. 1. Fig. 3 is a detail perspective view of a portion of the seed-controlling valve as used in the form of hoe illustrated in Figs. 1 and 2. Fig. 4 is a longitudinal sectional view of a modified form of the hoe. Fig. 5 is a perspective view of a valve guide used in the form of hoe as illustrated in Fig. 4. Fig. 6 is a perspective view of a seed valve as used in the form of hoe illustrated in Fig. 4.

The features in common in all of the forms of the hoe will be described first.

The hoe includes a hollow handle 1 which is preferably in the form of a pipe or tube having a plug 2 inserted in its lower or forward end. The said plug is preferably of wood. A ferrule 3 surrounds the lower or forward end of the handle 1 and also overlaps the lower or forward end of the plug 2 and serves as means for bracing the structure. The shank 4 of a hoe blade 5 is inserted in the plug 2 in the manner usually resorted to for attaching the shank of a hoe blade to a wooden handle. A cap 6 is screw-threaded or otherwise detachably mounted upon the upper or rear end of the handle 1 and a spring-actuated rod 7 passes through the cap 6 and is provided upon its projecting end portion with a knob or handle 8. The handle 1 is provided in the vicinity of the upper or rear end of the plug 2 with an opening 9 which is adapted to be used as a seed exit as will be explained hereinafter. A split or non-continuous band 10 snugly receives the handle 1 and is located adjacent the opening 9. The said band 10 is slidably mounted upon the handle 1 but the frictional contacts between the inner surface of the band and the exterior of the handle 1 is sufficient to hold the band 10 in a position that it is adjusted to upon the said handle. The band 10 is designed to increase or diminish the transverse area of the seed exit 9, and thereby governs the quantity of seed which may pass through the said opening.

A detailed description of the different forms of the modifications of the invention will now be given.

In the form as illustrated in Figs. 1, 2 and 3 a hollow seed-controlling valve 10' is slidably mounted in the handle 1 and is connected with the lower or forward end of the rod 7. The spring 11 which governs the rod 7 as illustrated in these figures bears at its lower or forward end against fixed stops 12 attached to the handle 1 and at its upper or rear end against a stop 13 which is carried by the rod 7. This spring 11 is under tension with a tendency to hold the stops 12 and 13 apart to the greatest extent. The cylindrical seed-controlling valve 10' is provided with an opening 14 which at times is adapted to register with the opening 9 whereby seed may be permitted to pass from the interior of the said valve 10' through the registering openings 14 and 9 and through the space between the ends of the valve 10'. The operation of this form of hoe is as follows. When the hoe is used so that an incision is cut in the soil with the blade 5 and it is desired to plant in the said incision seed, the operator holds the opening 9 in the handle 1 over the incision in the soil, then presses upon the knob or handle 8 whereby the rod 7 is moved longitudinally against the spring 11. This movement on the part of the rod 7 moves the seed-controlling valve down so that its opening 14 registers with the opening 9 in the handle 1 and seed is permitted to pass from within the valve 10′ through the said registering openings and between the ends of the valve 10′ into the incision previously made in the soil. As soon as the operator relieves pressure from the knob or handle 8, the tension of the spring 11 comes into play and moves the rod 7 in a reverse direction to that above described whereby the lower end of the seed controlling-valve 10′ is carried above the upper edge of the opening 9 and communication between the interior of the handle 1 and the opening 9 is broken. It is of course understood that if corn or other large grain is planted in the manner as indicated, the band 10 is moved along the handle in order to clear maximum space through the opening 9, but if peas or similar small seed is planted the said band 10 is moved along the opening 9 so as to partially close the same. Thus the passage-way through the opening 9 may be regulated to accommodate the particular kind of seed which is passed therethrough.

In the form of seeding hoe as illustrated in Figs. 4, 5 and 6 a guide 15 is positioned in the handle 1 in the vicinity of the seed outlet 9. This guide is approximately V shaped in edge elevation, but it may be of any other appropriate form. A valve 16 is slidably mounted between the side portions of the guide 15 and is provided with a flange 17 which projects through the opening 9 in the handle 1. The spring 11 bears at one end against the cap 6 and at its other end against a stop 18 fixed to the rod 7. The spring 11 is under tension with a tendency to hold the stop 18 away from the cap 6. In operating this form of hoe the incision is made in the ground as above stated and instead of pushing the knob or handle 8, the operator pulls upon the knob or handle 8 whereby the rod 7 is moved longitudinally against the tension of the spring 11. This movement upon the part of the rod 7 draws the valve 16 from over the opening 9. The flange 17 extending through the said opening limits the sliding movement of the valve 16. When the end of the valve 16 uncovers the opening 9 the seed may pass from within the handle 1 and between the sides of the guide 15 through the opening 9 and may fall into the incision previously made in the soil.

In the form of the invention as illustrated in Figs. 1 and 2 of the drawing wherein an inner valve 10′ is employed in the tubular handle 1 it is obvious that instead of reciprocating the inner valve 10′ as has been explained hereinbefore that the said valve 10′ may be caused to select the seed and drop the same when the said valve 10′ is rotated within the handle 1 and its outlet is in register with the outlet 9 of the said handle. When the parts are assembled so that this latter mode of operation may be resorted to the spring 11 may be dispensed with and the said valve 10′ may have its outlet at the same distance from the end of the handle 1 as the handle outlet 9. The outlet 9 is closed and opened by rotating the valve 10′ through the rod 7 and knob 8 in the manner as indicated.

Having described the invention what I claim as new and desire to secure by Letters Patent is:—

1. A seeding hoe comprising a hollow handle, a hoe blade attached thereto, said handle having a seed opening, a non-continuous band snugly receiving the handle and adapted to be adjusted over the seed-opening to increase or diminish the transverse area of the passage-way through the same, a spring-actuated seed-controlling valve slidably mounted in the handle and adapted to operate over the seed-opening, a cap detachably mounted at one end of the handle, a rod connected at one end with the said seed-controlling valve and projecting through said cap.

2. A seeding hoe comprising a hollow handle, a hoe blade attached to the handle, said handle having in its side a seed outlet opening, a cap detachably mounted upon one end of the handle, a valve guide located within the handle in the vicinity of the seed-outlet opening, a valve slidably mounted in said guide and having a flange which projects through the seed-opening, a rod connected at one end to said valve and passing through the said cap, and a spring located within the handle and arranged to exert stress upon the rod to normally hold the valve closed over the seed-outlet opening.

In testimony that I claim the foregoing as my own, I have hereto affixed my signature in the presence of two witnesses.

LEROY A. SANDOE.

Witnesses:
W. M. CAUTLEY,
W. E. BRIANT.

---

Copies of this patent may be obtained for five cents each, by addressing the "Commissioner of Patents, Washington, D. C."